United States Patent
Hay et al.

(10) Patent No.: US 11,067,539 B2
(45) Date of Patent: Jul. 20, 2021

(54) SYSTEM FOR DETECTING A BREAK IN A RAIL

(71) Applicant: Technological Resources Pty Ltd, Perth (AU)

(72) Inventors: Sid Hay, Perth (AU); Peter Crawford, Perth (AU); Izak Nieuwoudt, Perth (AU)

(73) Assignee: Technological Resources Pty Ltd, Perth (AU)

( * ) Notice: Subject to any disclaimer, the term of this patent is extended or adjusted under 35 U.S.C. 154(b) by 275 days.

(21) Appl. No.: 15/536,368

(22) PCT Filed: Dec. 23, 2015

(86) PCT No.: PCT/AU2015/050833
§ 371 (c)(1),
(2) Date: Jun. 15, 2017

(87) PCT Pub. No.: WO2016/101032
PCT Pub. Date: Jun. 30, 2016

(65) Prior Publication Data
US 2019/0086364 A1    Mar. 21, 2019

(30) Foreign Application Priority Data
Dec. 24, 2014  (AU) ................................ 2014905264

(51) Int. Cl.
*G01N 27/82* (2006.01)
*B61L 23/04* (2006.01)

(52) U.S. Cl.
CPC ............ *G01N 27/82* (2013.01); *B61L 23/044* (2013.01)

(58) Field of Classification Search
CPC ............ G01N 2291/2623; G01N 27/82; B61L 23/044
See application file for complete search history.

(56) References Cited

U.S. PATENT DOCUMENTS

| | | | | |
|---|---|---|---|---|
| 2,869,073 A | * | 1/1959 | McKee | ................ G01N 27/904 324/217 |
| 4,041,448 A | * | 8/1977 | Noens | .................... B61L 3/121 246/167 R |

(Continued)

FOREIGN PATENT DOCUMENTS

| | | |
|---|---|---|
| WO | 97/44654 A1 | 11/1997 |
| WO | 2010/117363 A1 | 10/2010 |

OTHER PUBLICATIONS

May 24, 2018—(EP) Extended European Search Report—App 15871355.2.

(Continued)

*Primary Examiner* — Reena Aurora
(74) *Attorney, Agent, or Firm* — Banner & Witcoff, Ltd.

(57) ABSTRACT

A system for detecting the presence of a rail end in a rail of a railway track includes a support structure mountable to a component of a rail vehicle. At least one magnetic field generator is carried by the support structure to generate a remanent magnetic field in the rail. A sensor arrangement is carried by the support structure in spaced relationship to the magnetic field generator to detect magnetic flux leakage associated with the remanent magnetic field. The sensor arrangement includes at least one pair of longitudinally spaced sensors, each sensor generating a measured signal based on the magnetic flux leakage detected by that sensor. A signal processing module is responsive to the measured signals to calculate a differential signal from the measured signals of the sensors of the at least one pair of sensors. The differential signal is indicative of the presence of a rail end in the rail.

15 Claims, 7 Drawing Sheets

(56) References Cited

U.S. PATENT DOCUMENTS

| | | |
|---|---|---|
| 4,792,755 A | 12/1988 | Hueschelrath et al. |
| 5,336,998 A * | 8/1994 | Watts .................... G01N 27/82 |
| | | 324/235 |
| 5,619,136 A | 4/1997 | Drury |
| 6,549,005 B1 | 4/2003 | Hay et al. |
| 9,662,591 B2 * | 5/2017 | Muller .................. A63H 19/32 |
| 2001/0019263 A1 | 9/2001 | Kwun et al. |
| 2005/0285588 A1 | 12/2005 | Katragadda et al. |
| 2013/0113472 A1 | 5/2013 | Blair et al. |
| 2014/0138493 A1 | 5/2014 | Noffsinger et al. |

OTHER PUBLICATIONS

Mar. 8, 2016—International Search Report and Written Opinion of PCT/AU2015/050833.

\* cited by examiner

SYSTEM FOR DETECTING A BREAK IN A RAIL

CROSS-REFERENCE TO RELATED APPLICATIONS

This application is a national phase application under 35 U.S.C. § 371 of International Application No PCT/AU2015/050833 filed 23 Dec. 2015, which claims the benefit of Australian Provisional Patent Application No 2014905264 filed on 24 Dec. 2014, the contents of which are incorporated herein by reference in their entirety.

TECHNICAL FIELD

This disclosure relates, generally, to the detection of a break in a rail of a railway track and, more particularly, to a system for detecting a break in a rail of a railway track.

BACKGROUND

At present, track circuits used for signalling on rails of a railway are also used as a means for detecting broken rails. However, the trend in railway signalling technology is moving away from systems based on fixed blocks and track circuits towards communications-based train control. This has the advantage of reducing wayside hardware. Further, there is the ability with communications-based train control to close up the train spacing and, in so doing, extract higher capacity from the track. However, for high haulage applications (particularly heavy haul rail applications) where broken rails present a substantial risk, the capacity benefits from communications-based train control cannot be fully realised without an alternative method of broken rail detection. Moreover, the high haulage (e.g. heavy haul) rail environment is an extremely rugged and hostile environment for signalling and/or detection equipment.

To the best of the applicant's knowledge, no such alternative methods of broken rail detection exist.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In a first aspect, there is provided a system for detecting the presence of a rail end in a rail of a railway track, the system including a support structure mountable to a component of a rail vehicle; at least one magnetic field generator carried by the support structure to generate a remanent magnetic field in the rail; a sensor arrangement carried by the support structure in spaced relationship to the magnetic field generator to detect magnetic flux leakage associated with the remanent magnetic field. The sensor arrangement includes at least one pair of longitudinally spaced sensors, each sensor generating a measured signal based on the magnetic flux leakage detected by that sensor; and a signal processing module responsive to the measured signals to calculate a differential signal from the measured signals of the sensors of the at least one pair of sensors, the differential signal being indicative of the presence of a rail end in the rail.

In this specification, the term "longitudinally" as used in reference to the spacing of the sensors is to be understood as meaning parallel to a longitudinal axis of the rail.

The sensors in the at least one pair of sensors may be configured to take measurements of the magnetic flux leakage substantially simultaneously. The sensor arrangement may include a plurality of transversely arranged pairs of sensors, all the sensors being configured to take measurements of the magnetic flux leakage substantially simultaneously. The sensors of the sensor arrangement may be arranged in at least two longitudinally spaced, transversely extending linear arrays of sensors.

The signal processing module may further comprise a discrimination module for enabling the signal processing module to discriminate between a planned rail end and an unplanned rail end, the unplanned rail end being representative of the break in the rail. This may be done by implementing logic rules and/or with the use of field markers. It is to be understood that a "planned rail end" includes artefacts such as insulated rail joints as well as other isolated rail geometry changes such as frogs, or the like.

The signal processing module may further compare the calculated differential signal from each pair of sensors to a threshold and, if the differential signal from each of more than a predetermined number of pairs of sensors exceeds the threshold, determine that a rail end exists. The signal processing module may apply at least one logic rule to the calculated differential signal to determine if the rail end is a planned rail end or an unplanned rail end. The signal processor may flag an unplanned rail end as a serious defect. The signal processing module may determine the differential signal from the measured signals by subtracting the two measured signals from the longitudinally spaced sensors of the at least one pair of sensors from each other. The differential signal may be indicative of a change in magnetisation over a distance. The change may be an average change. The distance may be equal to the longitudinal spacing of the sensors of the at least one pair of sensors.

The signal processing module may be implemented in hardware and/or software.

In this specification, the term "serious defect" is to be understood as a complete break in the rail or a serious surface defect which would rapidly progress to a complete break if not detected in a timely manner. An example of a serious defect is a crack which has developed in a head of the rail and has begun to grow deeper into, and extends across at least a half of, the head of the rail. Such a defect is likely to generate a response similar to a completely broken rail in the sensor arrangement. By mounting the sensor arrangement at the selected height, lower intensity signals, representative of surface defects present in the rail, other than serious defects, are less likely to result in signal processing circuitry associated with the sensor arrangement outputting a data signal, thus reducing the generation of false positives.

The height above the rail at which the sensor arrangement is arranged, in use, may be at least 5 mm. As described above, the system is intended for use in high haulage such as heavy haul applications. Such high haulage (heavy haul) applications occur in extremely hostile and rugged operating environment. If the sensor arrangement is mounted too close to the rail, it is unlikely to survive for long. Thus, the sensor arrangement may be arranged between at least 10 mm and 30 mm above the rail, in use.

The discrimination module may be configured to discriminate between planned and unplanned rail ends using a pattern recognition technique. The pattern recognition technique may be augmented, if necessary, by the use of at least one field marker.

The system may include a magnetic field marker associated with each of at least some rail ends of the railway track, the system further including at least one pair of laterally spaced sensors oriented to detect a magnetic field generated by the, or each, field marker.

The support structure may be configured to mount the magnetic field generator in a magnetic shadow of a wheel of the rail vehicle. By "magnetic shadow" is meant that the magnetic field generator is positioned sufficiently close relative to the wheel to inhibit the generation of spurious signals in wayside measuring equipment, such as an axle counter.

The sensor arrangement may be mounted on the support structure in a trailing position relative to the magnetic field generator. The system may include a pair of spaced magnetic field generators, arranged on opposite sides of the sensor arrangement, to facilitate bi-directional operation. The, or each, magnetic field generator may, in use, be spaced about 300 mm from the sensor arrangement in order for flux leakage from the remanent field to be detected.

The sensor arrangement may comprise a sensor head, the sensor head comprising at least one magnetically responsive transducer and the sensor head being dimensioned to have a width less than a width of a wheel of the rail vehicle. In an embodiment, the sensor head may comprise an array of transducers arranged to extend transversely relative to a surface of the rail.

In one embodiment, the array of transducers may comprise at least one linear array of transducers arranged to extend transversely relative to the surface of the rail. In another embodiment, the array of transducers may comprise at least two longitudinally spaced, transversely extending linear arrays of transducers.

The at least one magnetically responsive transducer may be a Hall Effect transducer. The, or each, Hall Effect transducer may be a linear output Hall Effect transducer (LOHET).

The sensor arrangement may include a height compensation mechanism to compensate for variations in height between the sensor arrangement and the rail.

The magnetic field generator may be mounted in a casing, the casing being configured to inhibit the attachment of magnetic detritus to the magnetic field generator.

In another aspect there is provided a method for detecting the presence of a rail end in a rail of a railway track, the method including: generating a remanent magnetic field in the rail; detecting magnetic flux leakage associated with the remanent magnetic field; generating a measured signal from each sensor of at least one pair of longitudinally spaced sensors of a sensor arrangement, the measured signals based on magnetic flux leakage detected by the pair of sensors; and calculating a differential signal from the measured signals of the sensors of the at least one pair of sensors, the differential signal being indicative of the presence of a rail end in the rail.

The method may include causing the sensors of the at least one pair of sensors to take the measurements of the magnetic flux leakage substantially simultaneously.

The sensor arrangement may include a plurality of transversely arranged pairs of sensors and in which the method includes causing all the sensors to take measurements of the magnetic flux leakage substantially simultaneously.

The method may include comparing the calculated differential signal from each pair of sensors to a threshold and, if the calculated differential signal from each of more than a predetermined number of the pairs of sensors exceeds the threshold, determining that a rail end exists.

The method may include applying at least one logic rule to the determination to indicate if the rail end is a planned rail end or an unplanned rail end.

The method may include flagging an unplanned rail end as a serious defect.

The method may include associating a magnetic field marker with each of at least some rail ends of the railway track and detecting a magnetic field generated by the, or each, field marker.

In a further aspect, there is provided a system for detecting a break in a rail of a railway track, the system including: at least one magnetic field generator carried by the support structure to generate a remanent magnetic field in the rail; a sensor arrangement carried by the support structure in spaced relationship to the magnetic field generator to detect magnetic flux leakage associated with the remanent magnetic field, the magnetic flux leakage being indicative of a break in the rail; and a signal processing module responsive to an output from the sensor arrangement, the signal processing module comprising a discrimination module to discriminate between a planned rail end and an unplanned rail end, the unplanned rail end being representative of the break in the rail.

The disclosure extends also to a rail vehicle which includes
 a body;
 at least one bogie on which the body is supported for traversing a railway track; and
 at least one system, as described above, for detecting a break in a rail of the railway track, the system being mounted to the bogie.

In this specification, the term "bogie" is to be understood, unless the context clearly indicates otherwise, to be a sub-frame of a railway car or locomotive carrying one or more wheel sets.

BRIEF DESCRIPTION OF DRAWINGS

Embodiments of the disclosure are now described by way of example with reference to the accompanying drawings in which.

DETAILED DESCRIPTION OF EXEMPLARY EMBODIMENTS

It is preferable to use a system for detecting rail defects (unplanned rail ends) in a railway track without having to refer to a database to discriminate between planned rail ends and unplanned rail ends in order to achieve high coverage of a mainline track. Experience gained in this work in devising systems based on feature databases indicates that there will be blind spots of tens of metres either side of each feature due to GPS inaccuracy (even with high precision GPS). While these blind spots may only be a few percent of the total track distance there is a disproportionate risk of serious rail defects, such as broken rails, occurring around such features.

1. Overview of the System

Figure 1:
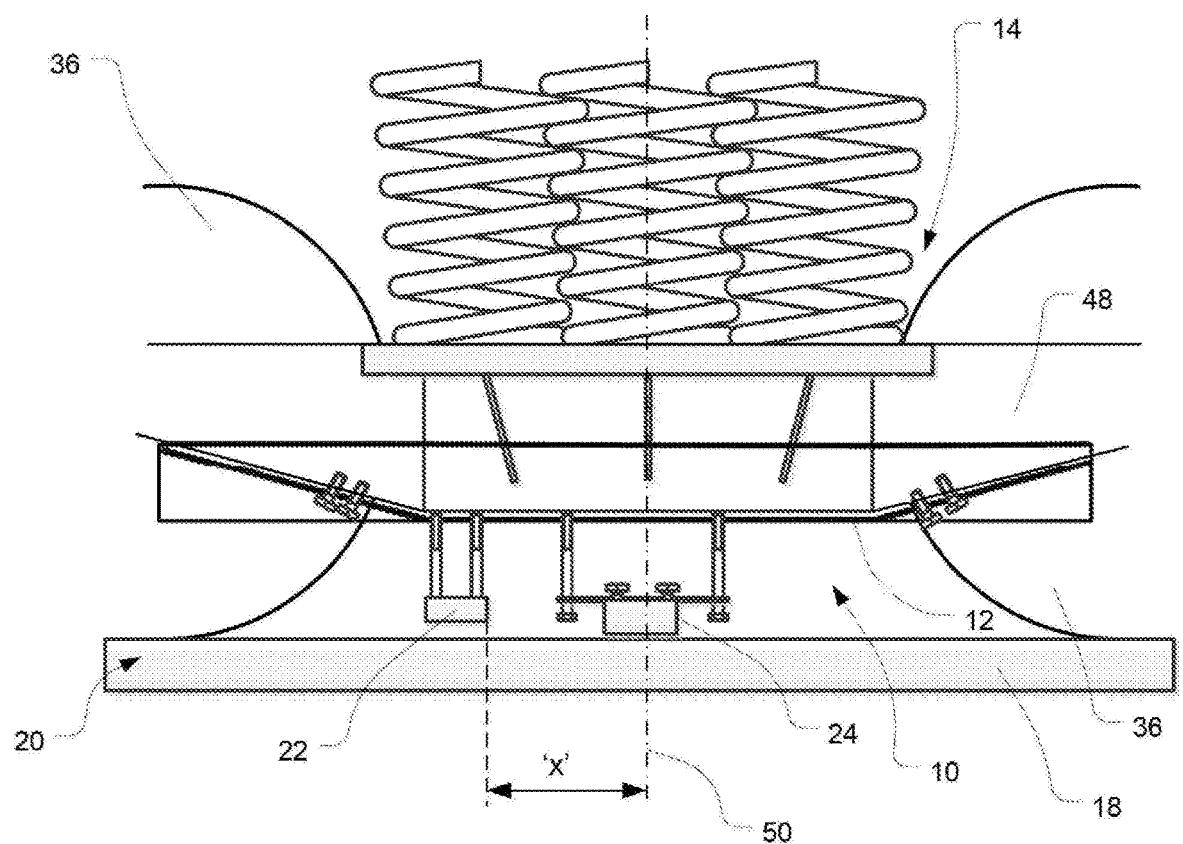
FIG. 1 shows a schematic, side view of a first embodiment of a system for detecting a break in a rail of a railway track, the system being shown in situ attached to a component of a rail vehicle.
Figure 2:
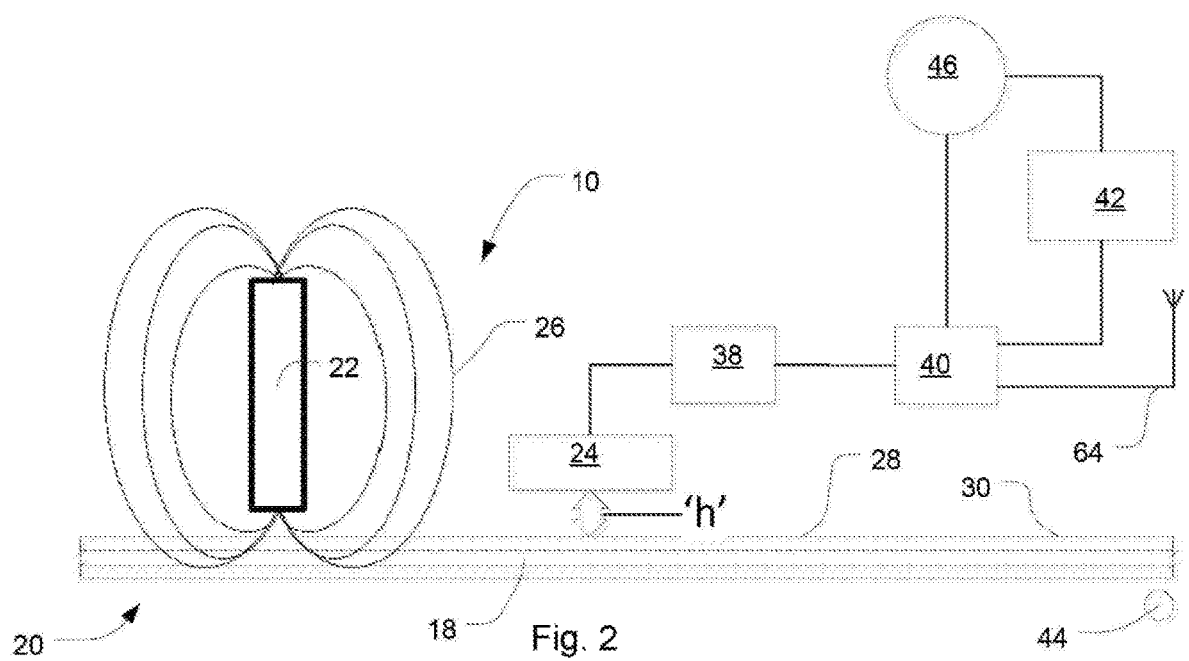
FIG. 2 shows a schematic, block diagram of the system of FIG. 1.
Figure 3:
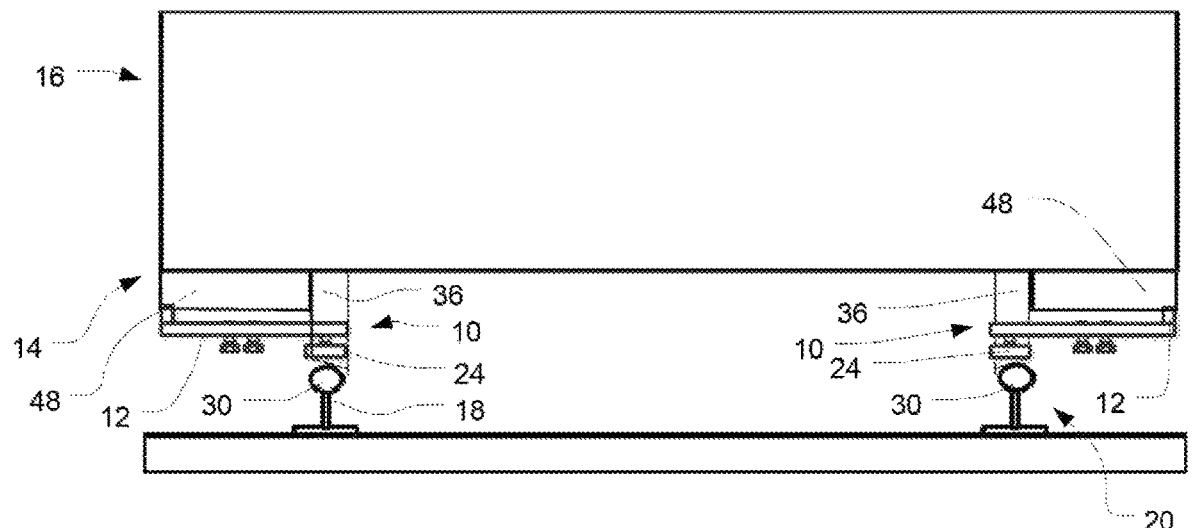
FIG. 3 shows a schematic, end view of an embodiment of a rail vehicle incorporating a pair of the systems of FIG. 1.

In FIGS. 1 to 8 of the drawings, reference numeral 10 generally designates a first embodiment of a system for detecting a break in a rail of a railway track. The system 10 includes a support structure in the form of a bracket 12 mountable, in use, to a component, in the form of a rail car bogie, 14 of a railway wagon or car 16 (FIG. 3). It will be appreciated that, in use, two such systems 10 are provided, one on each side of the car 16 to monitor both rails 18 of a railway track 20.

The system 10 includes a magnetic field generator in the form of a permanent magnet 22 suspended from the bracket 12 and a sensor arrangement 24 suspended from the bracket 12 in a trailing position relative to the magnet 22. Further, while only one magnet 22 is illustrated, it will be appreciated that two magnets 22, arranged on opposite sides of the sensor arrangement 24, could be provided to facilitate bi-directional operation of the system 10 on the rail car 16.

The magnet 22 generates a magnetic field 26 (FIG. 2). The magnetic field 26 generated by the magnet 22 induces a remanent magnetic field in the associated rail 18 of the railway track 20. The sensor arrangement 24 is configured to detect magnetic flux leakage associated with the remanent magnetic field, the characteristics of the magnetic flux leakage being indicative of a serious defect (as defined), rather than merely a surface defect, in the rail 18. This is dependent on the height of the sensor arrangement relative to the rail 18. To enable the sensor arrangement 24 to detect the magnetic flux leakage, it is mounted on the bracket 12 a distance of approximately 300 mm from the magnet 22 (or each magnet 22 in the case of a bi-directionally configured system 10).

As shown more clearly in FIG. 2 of the drawings, the sensor arrangement 24 is mounted at a height 'h' above a surface 28 of a rail head 30 of the rail 18. This height 'h' is selected to minimise the likelihood of the system 10 responding to magnetic flux leakage arising from surface defects in the surface 28 of the head 30 of the rail 18 other than serious defects such as rail breaks. For ease of explanation, the disclosure will be described with reference to the serious defect being in the form of a rail break in the rail 18.

However, it is to be understood that reference to a "rail break" includes a serious defect which rapidly leads to a complete rail break. As described elsewhere, a serious defect includes a crack in the head 30 of the rail 18 which extends more than halfway across the head 30 of the rail 18 and which is detected by multiple sensors (described in greater detail below) of the sensor arrangement 24. Such a defect is likely to become a full break in the rail 18 rapidly and early detection of such a defect is beneficial.

The applicant has found that arranging the sensor arrangement 24 at a height 'h' of greater than about 5 mm and, more particularly, in a range of between about 10 mm and 30 mm, or greater, enables the sensor arrangement 24 to respond to magnetic flux leakage indicative of a rail break. The applicant has also found that, surprisingly, this enables a sensor arrangement 24 to be installed on a rail car 16 operating in a high haulage (e.g. heavy haul) rail environment such as in the transportation of iron ore. Those skilled in the art will appreciate that this is an exceedingly hostile environment. The sensor arrangement 24 is able to operate with minimum likelihood of damage to the sensor arrangement 24 when arranged at the selected height.

Other ranges of height, depending on circumstances, include ranges of about 5 mm to about 10 mm, about 10 mm to about 15 mm, about 15 mm to about 20 mm, about 20 mm to about 25 mm and about 25 mm to 30 mm.

2. First Embodiment

Figure 4:
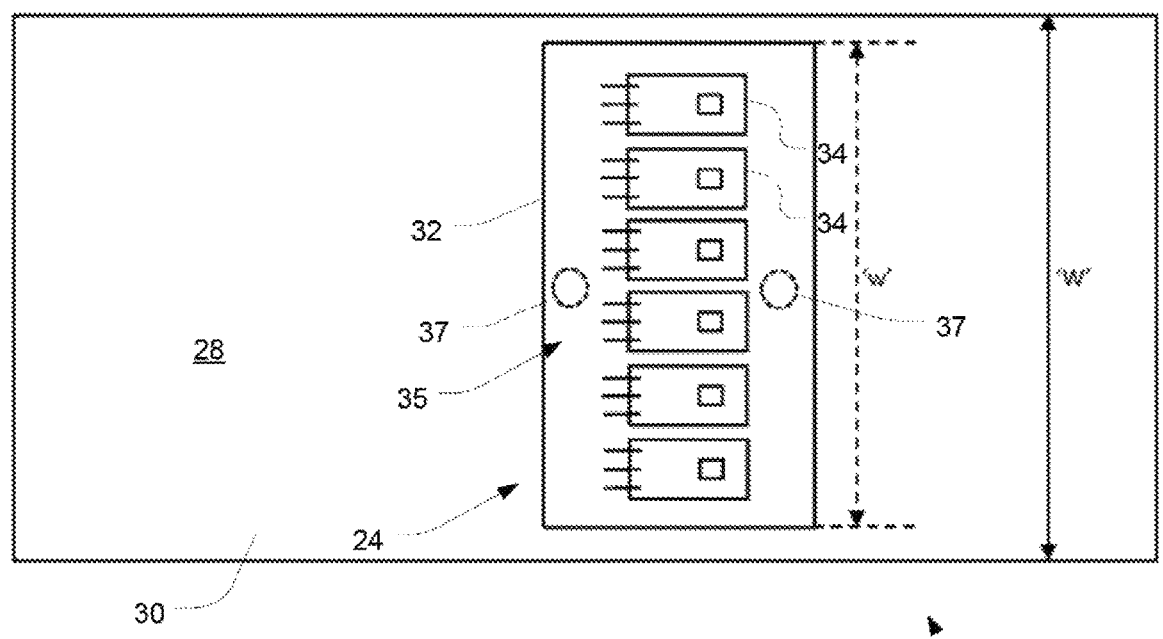
FIG. 4 shows an embodiment of a sensor arrangement of the system of FIG. 1.

The sensor arrangement 24 comprises a sensor head 32 (FIG. 4). The sensor head 32, in turn, comprises a plurality of sensing transducers, or sensors, 34 arranged to extend transversely relative to the surface 28 of the rail head 30 of the rail 18. The rail head 30 typically has a width 'W' of approximately 74 mm. Each wheel 36 of the rail car 16 has a width of approximately 140 mm. The sensor head 32 is selected to have a width 'w' of about 50 mm to 100 mm. In this way, the sensor head 32 is narrow enough to be well protected from lateral intrusions by being placed centrally over the rail head 30 relative to the width of the wheel 36, when the bogie 14 is centred on the rail track.

However, the sensor head 32 is sufficiently wide that it can accommodate lateral movement of the bogie 14 of the rail car 16 with enough sensors 34 always being positioned over the surface 28 of the rail head 30 of the rail 18 to register a rail-end signal on multiple sensors 34 of the sensor head 32 and to discriminate between a serious defect and an isolated surface defect in the surface 28 of the rail head 30 of the rail 18 that has not yet progressed to the status of a serious defect.

Each sensor 34 is a magnetometer, for example a linear output Hall Effect transducer (LOHET). A suitable sensor 34 is a Micro Switch LOHET having part number SS94A1F. (Micro Switch is a division of Honeywell). This sensor 34 has a typical sensitivity of 25 mV/Gauss at 8 VDC supply. In tests, the sensor 34 was powered by a ~9 volt supply. In one embodiment the output from each sensor 34 is processed directly. In another embodiment an output from each sensor 34 is connected to a filter circuit 38 (FIG. 2). One example of a suitable filter circuit 38 is in the form of an operational amplifier which is configured to provide a gain of approximately 210 and has a 1.0 µF input capacitor for AC coupling to provide high pass filtering. Its frequency response is such that the output is reduced below a speed of movement of about 0.5 metres per second. Another example of a suitable filter circuit 38 is a simple resistor-capacitor filter. High pass and low pass filters are used to remove any DC offset (e.g.

caused by differences in the pairs of sensors as described below with reference to the third embodiment), to assist in removing vibration artefacts, and to filter any RF level electrical noise and other noise from the signal of interest.

It will be understood that any of the processing done on the raw data output from the sensors (such as filtering or data manipulation) may be implemented in hardware, or in software, or with various combinations of hardware and software components.

In the embodiment illustrated in FIG. 4 of the drawings, the sensor head 32 comprises six sensors 34 transversely arranged relative to the rail 18, in use. The sensors 34 are spaced approximately 10 mm from each other to provide an effective 50 mm wide sensing zone. This provides effective coverage to take into account lateral movement of the bogie 14 of the rail car 16 on the rails 18. It will be appreciated that a greater or fewer number of sensors 34 may be provided depending on circumstances such as the width or other dimensions of the rail 18, the degree of lateral movement encountered, or the like.

Where two or more sensors 34 are arranged in relatively close proximity and, in use, take measurements concurrently, the resulting two or more measured signals may be processed to reject false positives from noise or other artefacts. The system 10 includes a signal processing module 40 to which an output from the filter circuit 38 is connected. The signal processing module 40 incorporates a processor which is able to discriminate between false positives arising from noise or other artefacts and signals representative of rail breaks. The processor of the signal processing module 40 must register the same signal from at least two of the sensors 34, and, preferably, about three to four of the sensors 34, to record a signal as a rail break.

The sensor head 32 of the sensor arrangement 24, optionally, includes a height compensating mechanism 35 (FIG. 4) to compensate for variations in height between the sensor head 32 and the surface 28 of the head 30 of the rail 18. The height compensation mechanism 35 includes a pair of longitudinally spaced proximity sensors 37. Each proximity sensor 37 has an output dependent on its sensed height relative to the surface 28 of the head 30 of the rail 18. The processor of the signal processing module 40 is configured to compensate for the change in signal strength output by the sensors 34 with variations in the height of the sensor head 32 relative to the surface 28 as measured by the proximity sensors 37. However, as described in greater detail below, the tests conducted by the applicant indicate that height compensation may not be required in the sensor head 32.

3. Second Embodiment

Figure 5:
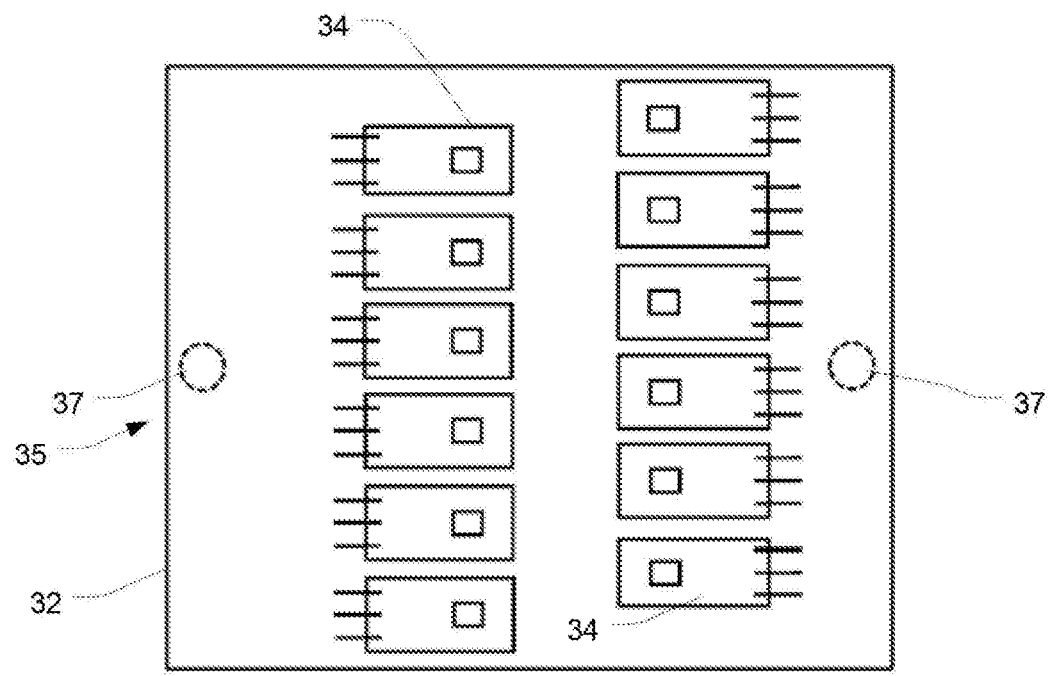
FIG. 5 shows another embodiment of the sensor arrangement of the system of FIG. 1.
Figure 6:
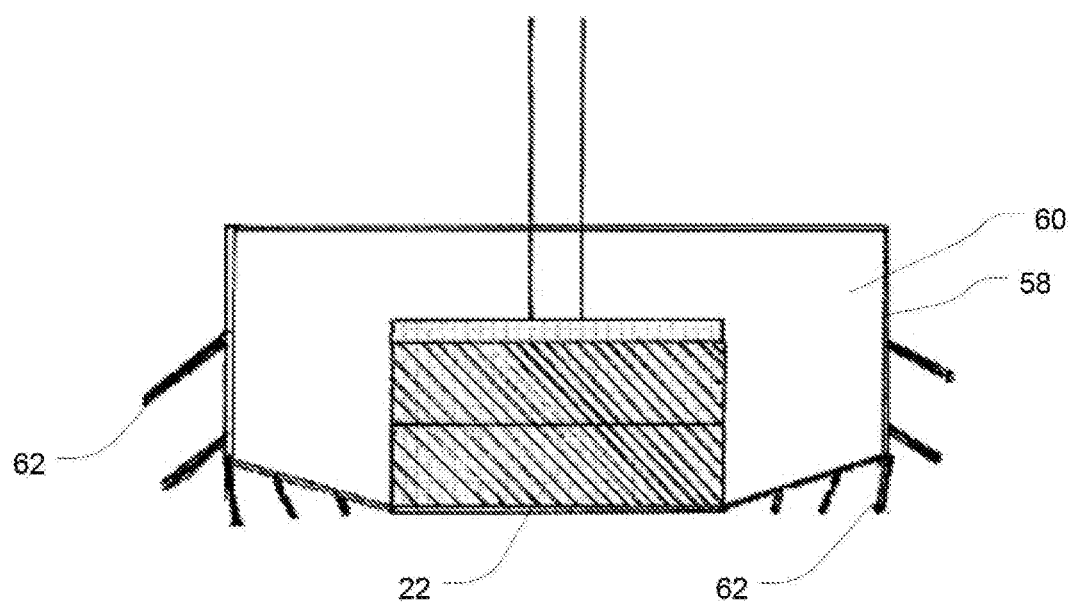
FIG. 6 shows a schematic representation of a mounting of a magnetic field generator forming part of the system of FIG. 1.

FIG. 5 shows another embodiment of the sensor head 32. With reference to FIG. 4 of the drawings, like reference numerals refer to like parts, unless otherwise specified. In this embodiment, the sensor head 32 comprises two longitudinally spaced, transversely extending, linear arrays of sensors 34. With this arrangement, the length of any rail break can also be determined as well as the direction in which the rail car 16 is travelling. In addition, the use of the two linear arrays of sensors 34 assists in rejecting noise. There should be a repetition of the high amplitude signal representative of the rail break over both linear arrays of sensors 34. This helps to remove the effects of electrical noise which can result in high transient signals on both arrays of sensors 34 simultaneously. With a time lag between the presence of the high amplitude signals over the two arrays, this is indicative of a rail break being present rather than a noise artefact.

The linear arrays of sensors 34 are spaced approximately 30 mm to 50 mm from each other in the longitudinal direction to discriminate between signals representative of a rail break and those arising from noise artefacts. In another embodiment, the linear arrays may be spaced less than 30 mm from each other in the longitudinal direction, for example, between about 5 mm and 25 mm from each other.

4. Third Embodiment

Figure 9:
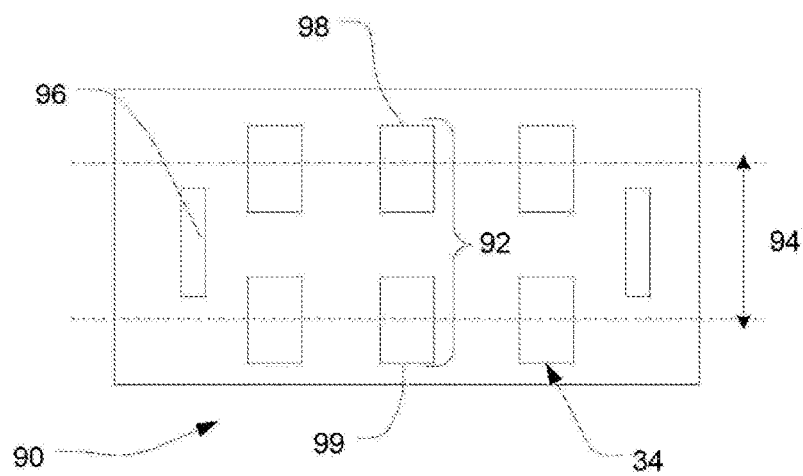
FIG. 9 shows a schematic representation of a sensor arrangement of a second embodiment of a system for detecting a break in a rail of a railway track.

With reference to FIG. 9 of the drawings, a further embodiment of the system 10 is described, FIG. 9 showing an embodiment of a sensor arrangement 90. Once again, with reference to previous embodiments, like reference numerals refer to like parts, unless otherwise specified.

In this embodiment, the sensor arrangement 90 comprises a plurality of transversely spaced pairs 92 of longitudinally spaced sensors, the sensors of one pair 92 being labelled as 98 and 99 in FIG. 9 of the drawings. Each pair 92 of sensors 34 is spaced a distance 94 of between about 5 and 30 mm apart, for example 15 mm apart. Each sensor 34 of each pair 92 of sensors measures the remanent magnetisation on the rail 18 at the substantially the same time, resulting in two simultaneous signals indicative of an average change in magnetisation over the distance 94. For increased accuracy and to accommodate lateral movement of the bogie 16 on the rail 18, the sensor arrangement 90 shown in FIG. 9 includes three pairs of sensors, the pairs being spaced transversely across the width of the rail 18. The pairs are spaced in a range between about 10 and 50 mm apart. In this embodiment, the pairs are spaced about 20 mm apart.

Figure 7:
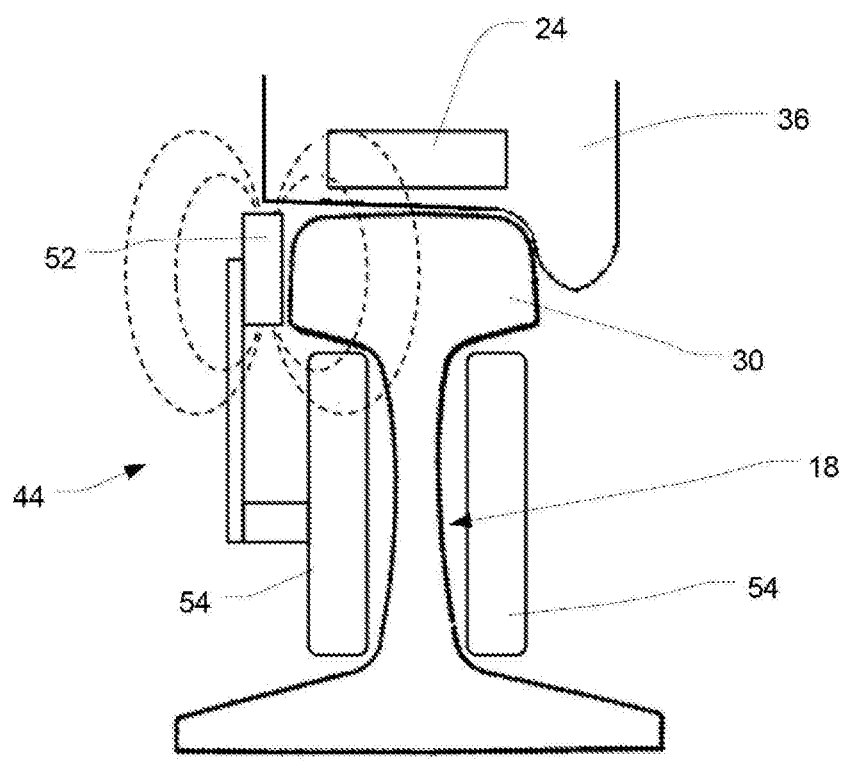
FIG. 7 shows a schematic end view of an embodiment of a field marker for use with the system of FIG. 1.
Figure 8:
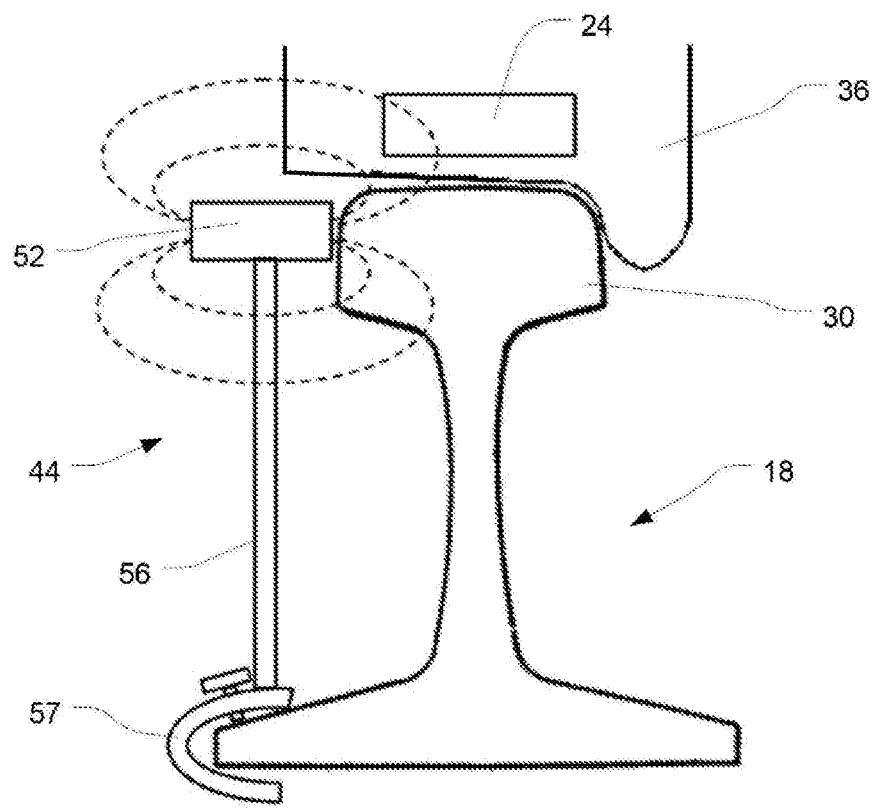
FIG. 8 shows a schematic end view of another embodiment of a field marker for use with the system of FIG. 1.

The sensor arrangement 90 further includes a pair of laterally spaced marker sensors 96 (spaced approximately 50 mm apart). These marker sensors 96 are configured to measure either a vertical or a horizontal magnetic field generated by a field marker 44 (as shown in FIG. 7 and FIG. 8 respectively) which may be placed on one or both sides of the rail 18 (see description elsewhere herein describing field markers). Because of the magnetic strength of the field markers (and because the marker sensors 96 are not used to sense a remanent magnetic field), the marker sensors 96 may, for example, be positioned further away from the rail, and/or may have less sensitive magnetometers than the sensors 34 of the sensor pairs 92.

Figure 10:
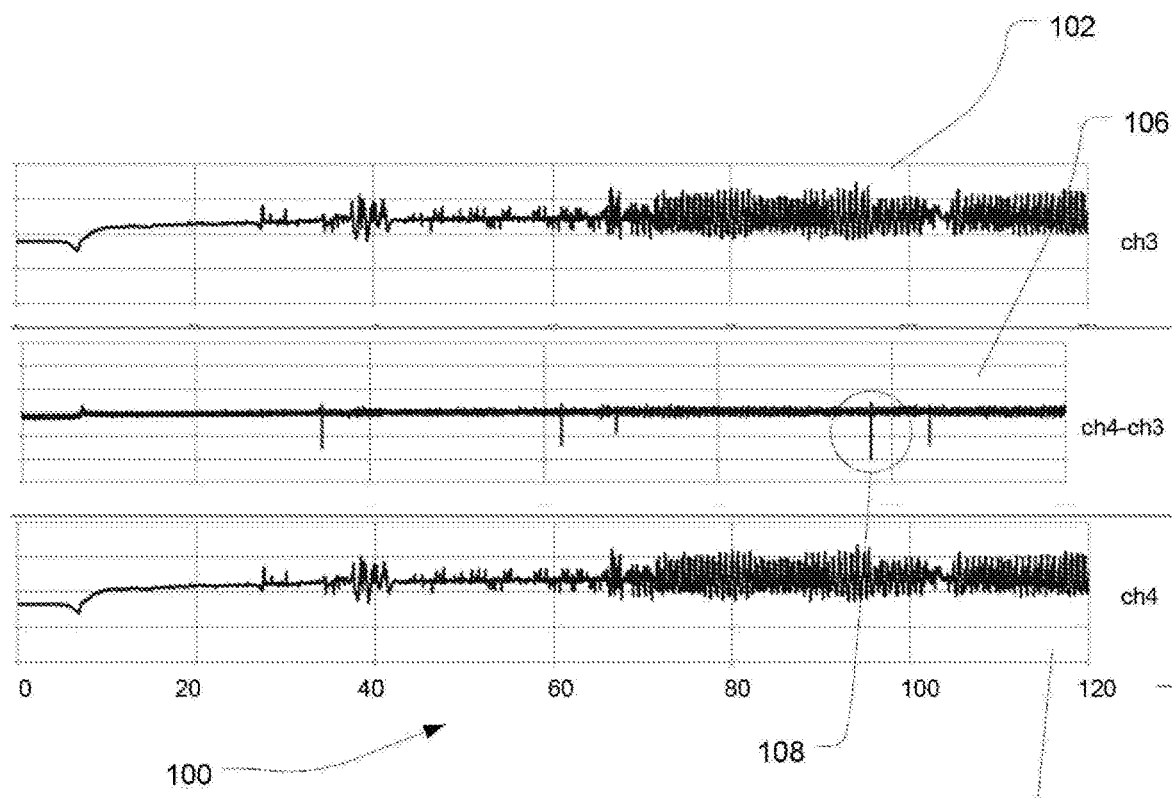
FIG. 10 shows graphs of sensor measurements from the sensor arrangement of FIG. 9 before and after processing.

FIG. 10 shows graphs 100 of sensor measurements before and after processing. Sensor 98 in FIG. 9 provides the channel 3 signal trace 102 shown in the top graph, and sensor 99 provides the channel 4 signal trace 104 shown in the bottom graph. These two signals 102, 104 are produced concurrently, and represent the magnetic field as sensed the distance 94 apart.

The average change in field strength, measured in [Gauss/mm], is given by equation (1):

$$(Ch4 - Ch3)\frac{C}{D} \qquad \text{Equation (1)}$$

where C is a constant to convert the sensor output from mV to Gauss, and D is the distance 94. As C and D are both constants, a differential signal 106 determined from the difference (Ch4−Ch3) shown in the middle graph is used as an indication of changes in the magnetic field. As can be seen, what appears to be noise present on the signals 102, 104 is significantly reduced when this differential signal 106 is determined. The peaks in the differential signal 106, for example peak 108, are indicative of rail ends, e.g. possible serious defects (as defined) such as rail breaks.

In practice, there is very little electrical noise present. The variations that can be seen in the signals 102, 104 (particularly the right hand part of the traces) arise from real variations in the magnetic field due to, for example, prior rail magnetisation and relative movement of the bogie 14 to the track, both laterally and vertically.

Figure 11:
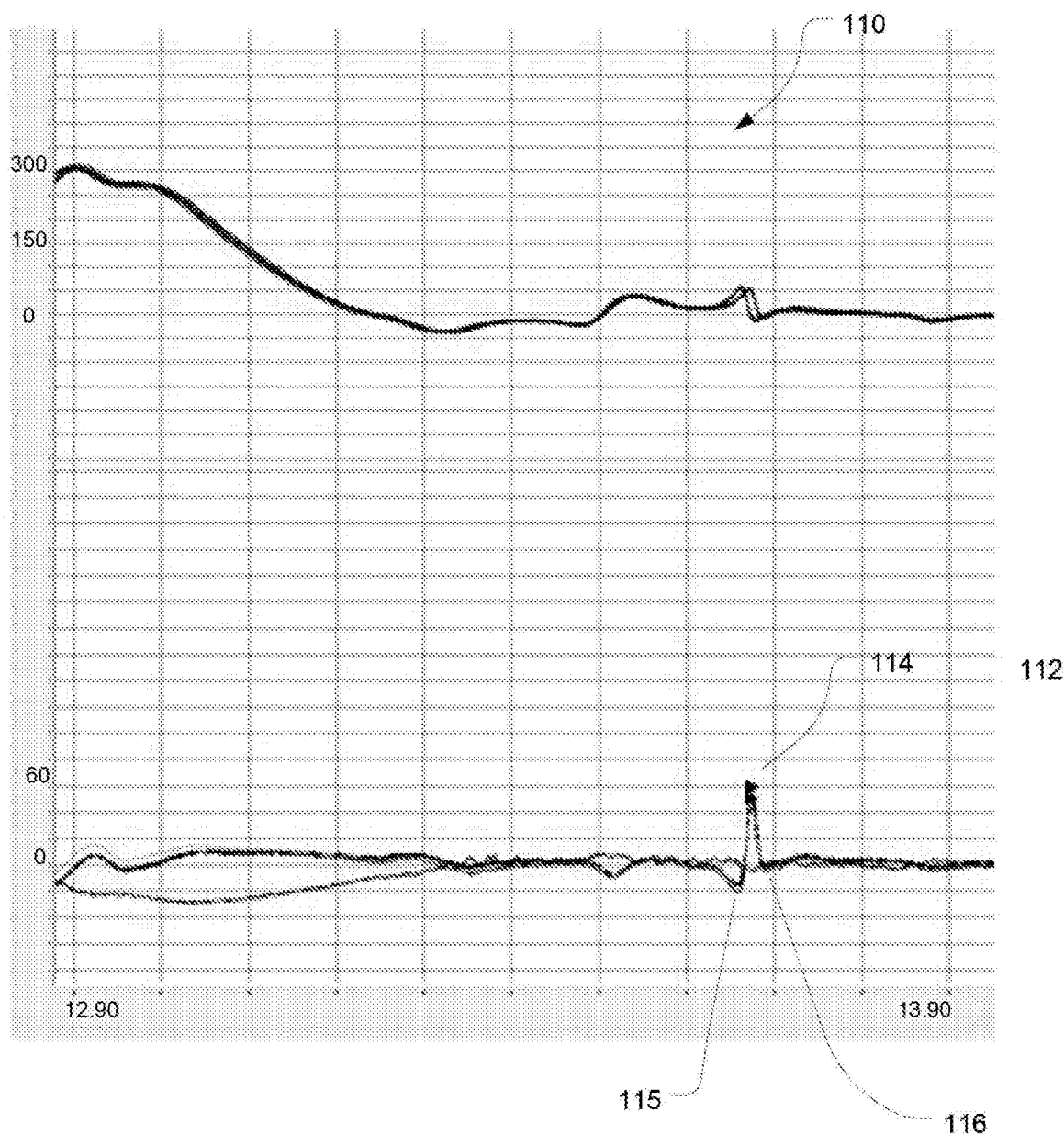
FIG. 11 shows a graphical representation of measured and processed signals of the second embodiment of the system.

An advantage of using this differential method (as opposed to, for example, using a simple threshold) to determine whether the measured signal indicates a significant change in the magnetic field may be understood more clearly with reference to FIG. 11. FIG. 11 shows raw signal traces 110 at the top as output by the sensors 98 and 99, for example. The differential signal 112 is shown at the bottom. In this example the raw signals 110 show a large increase in measured flux at the left (between 12.90 and 12.94 seconds), much more than the peak shown towards the right at around 13.05 seconds. This phenomenon may be due to remanent magnetic fields resulting from the magnetisation of the rail during the fabrication process of the rail where magnetic cranes may have been used to manoeuvre the rail.

The differential signal removes noise that results, for example, from cables and power supplies, but also removes the effects of these magnetic fields to indicate the position of a possible rail end at 114 more accurately.

It is noted that the embodiment of FIG. 5 may also be able to be used in this embodiment where opposed sensors in each linear array, albeit offset with respect to each other, are paired together. The paired sensors 34 provide two substantially simultaneous signals indicative of an average change in magnetisation over the distance separating the arrays from which the differential signal 106 is able to be obtained.

5. Planned and Unplanned Rail Ends

The system 10 needs to discriminate between so-called "planned" rail ends, such as insulated rail joints (IRJs), welds, or the like, and "unplanned" rail ends signifying rail breaks. For this purpose, the system 10 includes a discrimination module 42 in communication with the processor of the signal processing module 40.

The discrimination module 42 is able to be implemented in a number of ways. In one implementation, the discrimination module 42 makes use of markers, one of which is shown, schematically, at 44 in FIG. 2 of the drawings. These markers 44 identify planned rail ends that are recognised by the discrimination module 42 of the system 10 to inhibit the generation of false positives when the system 10 detects planned rail ends.

In addition, or instead, the discrimination module makes use of pattern logic stored in a data store, such as a database, 46 of the system 10. The pattern logic makes use of two tests.

a. Logic tests

In test one, if the sensor head 32 of the sensor arrangement 24 detects a rail end on one rail 18 and then detects a rail end on the second rail 18 within 'A' metres of the rail end on the first rail, the system 10 logs the two rail ends as a pair of insulated rail joints (IRJs), otherwise the system 10 logs a broken rail occurrence.

With the first test, the first rail end detected on either rail 18 starts the test. The test is terminated by the detection of a rail end on the other rail within 'A' metres or by reaching a distance of 'A' metres from the first rail end. The test restarts at the next rail end after termination of the previous test. The distance of 'A' metres is set to be greater than the minimum amount of known stagger between IRJs, typically about 2.5 metres.

In test two, which is independent of test one, if the sensor head 32 of the sensor arrangement 24 detects one rail end on one rail 18 and then detects a second rail end on the same rail 18 within 'B' metres on the same rail, the second rail end is logged as a broken rail occurrence by the system 10. The distance of 'B' metres is set to be less than the closest spacing of two IRJs on one rail or is set to be greater than the distance of 'A' metres. A typical value for 'B' is between about 4 and 5 m.

With these two tests, the likelihood of the discrimination module 42 causing the system 10 to generate false positives is very low and almost all cases of actual rail breaks should be detected by the system 10. Possibly one of the only occurrences of actual rail breaks which will not generate a true positive is where a break occurs in each rail 18, the breaks being within 'A' metres of each other.

There are an additional two situations that will result in false alarms being generated due to being detected by the first test. These two additional situations are, firstly, a plated single temporary joint in the main line as a result of a re-rail and, secondly, a plated previously broken rail awaiting repair. There are various solutions to inhibit these situations causing the generation of false positives.

A procedure can be adopted within an operations centre, which controls trains running on the railway line 20, whereby a limited database of temporary joints is stored in the data store 46 to be accessed by the discrimination module 42 to discount false positives from these two situations. Instead, data relating to the temporary joints can be stored in the data store 46 of the system 10. Still further, field markers such as those shown at 44 can be used at the location of the temporary joints, the system 10 reading such field markers 44 to discount false positives from these two situations.

b. False Positives and the Use of Field Markers

In addition, or instead, field markers such as those shown at 44 can be used at the location of the temporary joints, the system 10 reading such field markers 44 to discount false positives from these two situations. The field marker 44 used for the above situations incorporates a magnet 52. Two variations of applying the magnetic field marker 44 are used. In the first instance, as shown in FIG. 7 of the drawings, the magnetic field marker 44 is placed at the temporary joint mounted on a fishplate 54 adjacent to the joint line on the field side of the rail 18. The field marker 44 is selected to have sufficient field strength with its magnetic pole axis of the magnet 52 oriented vertically (as shown in FIG. 7) or horizontally in the transverse direction (as shown in FIG. 8).

In some embodiments the field markers 44 have sufficient strength so that a saturation of most or all of the sensors 34 of the sensor head 32 occurs when detected by the sensors 34. In other embodiments the magnet is oriented to produce a lateral field and one or more dedicated field marker magnetometers 96 are configured so that they are oriented suitably to sense the magnetic field from the field markers 44, as described above with reference to the embodiment of FIG. 9 of the drawings. The signal processing module 40 then interprets the sensed magnetic field to determine whether an event is to be disregarded on the basis that the event is a planned rail end.

In the second variation shown in FIG. 8, the magnet 52 of the magnetic field marker 44 is placed on a bracket 56 of a non-magnetic material which, in turn, is clamped, via a non-magnetic clamp 57, on the other rail 18 opposite the planned joint line, but within a longitudinal tolerance defined by the above logic rules for discrimination, on the field side of the rail 18. Once again, the magnet 52 of the field marker 44 is selected to have sufficient field strength to saturate most or all of the sensors 34 of the sensor head 32. This creates an artificial rail end signal on the opposite rail 18 such that it appears to the system 10 that a pair of joints is present. As a result, test one applies and the single joint is not reported as a broken rail.

It will be appreciated that, in either variation, the magnet 52 could be arranged vertically or horizontally and the arrangement of the magnet 52 is not restricted to the illustrated orientations in FIGS. 7 and 8 of the drawings.

The use of the field marker 44 has the advantage of a fail to safe operation. If the magnetic field marker 44 is missing or is placed in the wrong orientation, the temporary joint is reported as a broken rail. There is a small chance that a hazard will be created where, if the field marker 44 is left on the rail 18 and then an actual broken rail occurs at that location, the broken rail will not be detected. This is a very low probability event and could be mitigated further by building the field marker 44 into the fish plate 54, rather than having it as a separate component, so that the field marker 44 only remains on the rail if the fish plate 54 is left in position on the rail 18.

It will also be appreciated that either embodiment of the field marker 44 could be mounted on the gauge side of the rail 18 but would need to be mounted lower to avoid having the magnet 52 struck by the flange of the wheel 36 of the rail car 16. This may reduce the efficacy of the field marker 44 so the preference is to place it on the field side of the rail 18.

c. Open Throat Frogs

There are also five situations or artefacts which could result in the generation of false positives. These five situations are the following: open throat frogs (in back track turnouts on passing tracks at some stations); blades of points or swing nose frogs in mainline turnouts; level crossing panels; guard rails opposite open throat frogs and steel structures around swing nose frogs.

In trials of the system described herein, it was found that swing nose frogs were unlikely to result in false positive indications of rail ends. However, there were signal variations indicative of rail ends at open throat frog turnouts at manganese steel frogs. This may be due to the non-magnetic type of steel used in these frogs so that the transition from standard rail steel to the frog area is logged as a magnetic rail end.

There are a number of options for disregarding false positives caused by open throat frogs. One option is to use field markers as described above. However, typical open throat frogs result in two events (one on either rail), with a consistent spacing (typically 5.2 m in Australia). Therefore it is also possible to implement an additional logic rule (test three) during post-processing of the data in order to rule out false positives resulting from open throat frogs, by disregarding a pair of events on both rails that are spaced approximately 5.2 m apart.

Yet a further implementation of the discrimination module 42 includes the use of structures associated with standard rail track components to identify planned rail ends. Such structures include insulated joint fish plates or bolts and turnout blades, bolts and other supporting structures associated with turnouts.

Still a further implementation of the discrimination module 42 includes the use of a database of locations of planned rail ends which, in use, are stored in the data store 46. The discrimination module 42 then compares an actual location of a detected rail end and/or the number of rail ends found in a specific length of rail against the stored number of rail ends.

6. Configuration and Construction

The magnet 22 can adopt various shapes depending on the strength of magnetisation of the rail 18 required to generate the remanent magnetic field in the rail 18. For example, tests have been conducted with magnets having the following characteristics: 20 mm diameter×10 mm thick Neodymium Iron Boron rare earth magnets. Because of the small size of these magnets they were placed closer to the surface 28 of the rail 18 than would be the case for larger magnets to be used in practice. The larger magnet has dimensions of 100 mm×50 mm wide×25 mm thick.

In the case of smaller magnets, these magnets were placed between 3 mm and 9 mm above the surface 28 of the rail 18 in tests conducted by the applicant. For the larger magnets, these are able to be placed at a height of approximately 10 mm to 30 mm above the surface of the rail.

In use, a system 10 is secured, via its bracket 12, to an outer side of each side frame 48 (FIG. 1) of one bogie 14 of the rail car 16 as shown in FIG. 3 of the drawings. The sensor arrangement 24 is positioned on the bracket 12 to lie substantially on a centre line 50 of the bogie 14. The magnet 22 is arranged in a leading position relative to the sensor arrangement 24, a distance 'x' from the centre line 50 of the bogie 14. The distance 'x' is selected depending on the dimensions of the bogie 14 so that the magnet 22 is within a magnetic "shadow", as defined, of the leading wheel 36 carried on the bogie 14. For example, the distance 'x' is of the order of 400 mm from the centre line 50 of the bogie 14. With this arrangement, the likelihood of the magnet 22 causing spurious signals on trackside equipment, such as axle counters or wheel proximity sensors, is reduced since such trackside equipment is likely to register only one artefact, the wheel 36, rather than two separate artefacts of the wheel 36 and the magnet 22.

Tests conducted by the applicant, both on the bench and on an actual railway track show that the system 10 is able to distinguish between rail breaks and other, surface defects and/or welds in the rail 18 over a range of heights of the sensor head 32 relative to the surface 28 of the head 30 of the rail 18. Even at a height of approximately 32 mm, the output from the sensors 34 is sufficiently different between a rail break and a weld to enable the system 10 to discriminate between a break in the rail 18 and a weld or other surface defect. For example, a peak-to-peak output signal from one of the sensors 34 for an aluminothermic weld at a sensor 34 height of 11 mm has been measured to be only 33% of a rail break signal at a sensor 34 height of 32 mm. This is indicative that, even without height compensation, the system 10 is able to discriminate between these two artefacts.

Thus, the processor of the signal processing module 40 is implemented to distinguish between peaks generated as a result of magnetic flux leakage of the remanent magnetic field in the rail and associated with surface defects or welds in the rail 18, and peaks generated as a result of magnetic flux leakage of the remanent magnetic field associated with a break in the rail 18. The processor of the signal processing module 40 is programmed only to output a signal associated with the larger peaks thereby reducing the likelihood of false positives being generated due to the detection of surface defects or welds in the rail 18.

Additional tests conducted by the applicant have noted the build-up of magnetic particles or other magnetic detritus on the magnet 22. It appears that, generally, such magnetic particle build-up on the magnet 22 does not adversely affect the generation of a remanent magnetic field in the rail 18. However, in the event that there is a deterioration in the generation of such a remanent magnetic field, the magnet 22 can be housed in a casing or shroud 58 (FIG. 6) of a non-magnetic material. The casing 58 defines a void which is either fully sealed or filled with a castable non-magnetic material, such as an electrical potting compound or an epoxy resin, to inhibit the entry of foreign particles into the housing 58.

The casing 58 carries baffle elements, such as fins 62, to inhibit migration of contaminants around the casing 58. This limits the amount of flux short-circuited between the poles of the magnet 22 by the detritus and, in so doing, maximises the amount of magnetic flux passing into the rail 18 from the magnet 22. The fins 58 are resiliently flexible, particularly in regions where they may be exposed to mechanical damage.

In some instances, broken rails may create a very large rail end gap, for example, several hundred millimetres. In order to take this into consideration appropriately when assessing the measured data from the sensors 34, vertical side frame acceleration measurements may also be taken with the use of accelerometers. These measurements provide an indication of gaps with a width of ~100 mm or greater without generating false alarms at smaller rail surface imperfections such as dipped welds that also cause side frame accelerations.

7. Determining the Presence of a Fault

Figure 12:
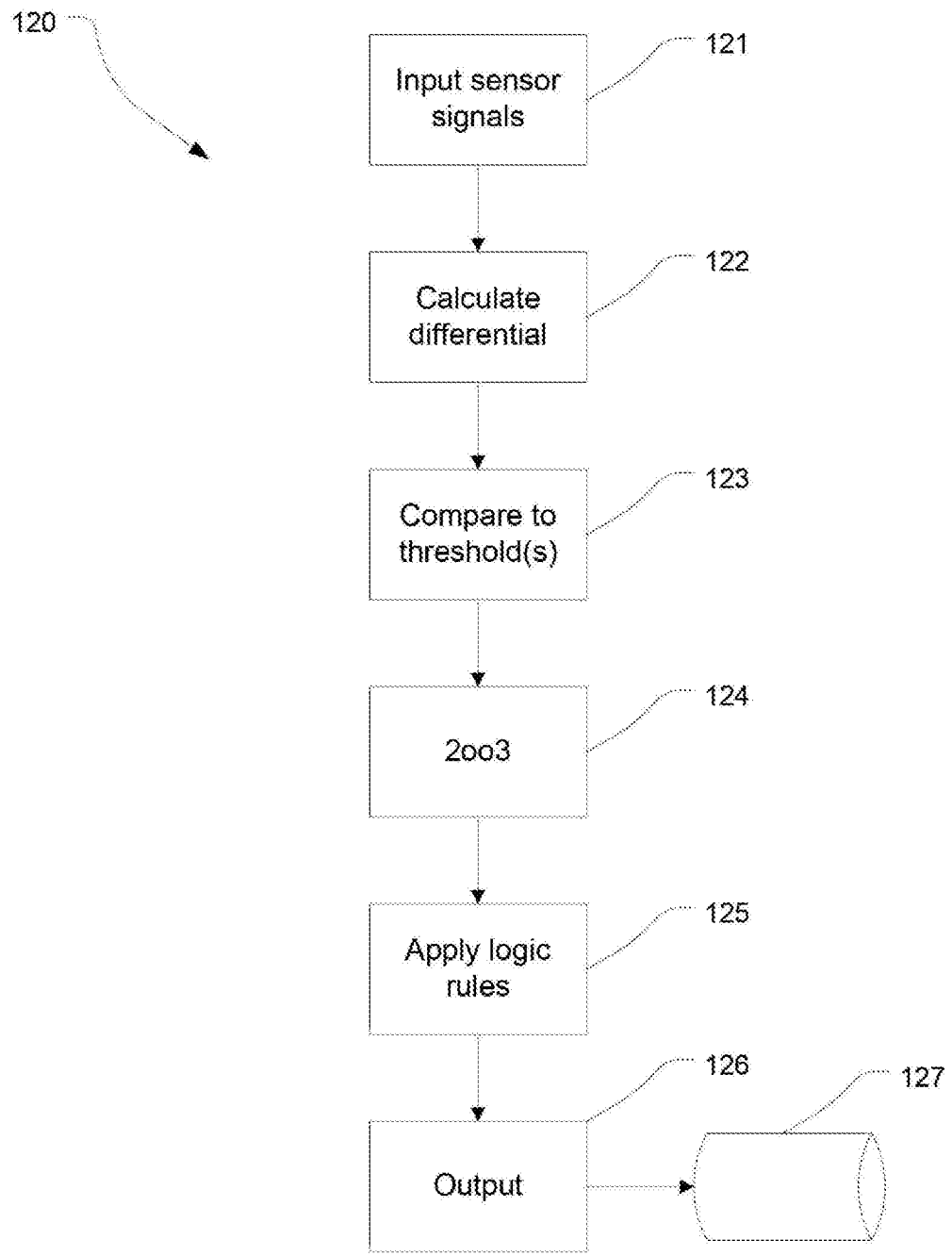
FIG. 12 is a flow diagram describing the use of sensor signals to determine the presence of rail defects using the second embodiment of the system.

FIG. 12 shows a flow diagram of the process 120 used to determine whether a fault is present on a line from the signals received from the sensors 34 using the embodiment of FIG. 9 of the drawings.

At 121, the raw sensor data is received from each sensor of the three pairs 92 of sensors 34 as well as from the pair of marker sensors 96, if applicable. Some preliminary processing (implemented in hardware and/or software), for example low-pass filtering, may be included.

At 122, a differential signal is calculated from each pair 92 of sensors 34, as well as from the pair of marker sensors 96 if applicable, by subtracting one signal from the other per pair. The calculated differential signal for each pair of sensors, is then compared to a threshold at 123. The threshold used for the marker sensors 96 would typically differ from the threshold used for the sensor pairs 92. For the specific LOHETs used in this example for the sensors 34 (Honeywell SS94A1F LOHETs), a threshold of between 50 and 150 mV was used, and for the marker sensors 96 a threshold between 100 mV and 1V was used.

At 124, rail end features are identified when two out of the three differential channel pair signals exceed the selected threshold, the so-called "two out of three" (2oo3) rule. Where a 2oo3 rule is applied, a lateral channel spacing of 20-25 mm is appropriate. If a larger channel spacing is used (e.g. 40-50 mm), a 1oo3 rule is used.

In one embodiment, a "dual threshold" method is used to improve the accuracy of the final results. For the sensors 34, it was found that different features may be detected when using a low threshold (e.g. 50 mV) versus when using a high threshold (e.g. 100 mV). For example, the low threshold may include false positives while the high threshold may miss some faults. In the dual threshold embodiment, the results from using both the low and high thresholds are used and subsequently both considered during further processing steps. Where only one threshold was used (e.g. 100 mv), then, if a single pair of sensors indicates a fault, it is considered a false positive and the results are ignored. In embodiments where the dual threshold method is used, then, if a single pair of sensors indicates a fault with a 100 mV threshold, then the 50 mV threshold data is also considered before a decision is made about ignoring the results: if the other pairs do not indicate that the 50 mV has been met, then the results are ignored, and vice versa.

As can be seen from the traces shown in FIG. 11, because of the way that the slope of the magnetic field changes it is possible to generate three peaks in each trace: the main peak 114, and secondary peaks 115, 116 (of an opposite sign) to each side of the main peak 114. In some cases more than one peak will meet the threshold. These need to be considered as a single rail end for the logic rules to work correctly so the secondary peaks 115, 116 are removed before the logic rules are applied. The secondary peaks are removed from the data to be considered in step 125 if the secondary peaks are within a small distance from one another, for example if they are less than 50 mm from one another. In one embodiment these peaks are removed as part of the processing that compares the differential signal to the one or more thresholds at 123.

At 125, the three logic rules are applied:
test one: if rail ends are found on the two separate rails, and these rail ends are within 2-3 m of one another (typically 2.5 m), then this is considered to be an IRJ;
test two: if two rail ends are found on the same rail at a spacing of less than the minimum known IRJ spacing (typically between 4 and 5 m), then this is considered to be a broken rail;
test three: if there are two events on one rail with an approximately 5.2 m spacing, it is indicated as an open throat frog.

For test one above, in the dual threshold embodiment, if an event is detected on one rail with a 100 mV threshold but not on the other, then the differential signal for the other rail may be reconsidered with a 50 mV threshold to determine the possible presence of an IRJ.

In addition to these three tests, any number of additional tests may be used to refine the results, depending on the circumstances. One additional test is testing whether detected rail ends (following tests one to three) occur at substantially the same location as a detected field marker, in which case the particular rail end is determined to be a planned rail end.

At 126, the list of faults as determined during the preceding steps is output. The list may include both planned and unplanned rail ends as determined by the method. The output may be used to update a local and/or a centralised database 127. Instead, or in addition, the output may also be used as an input to a local control system to effect a relevant outcome, e.g. to mark the rail in the vicinity of a serious defect or to control the operation (e.g. speed) of the train.

8. Advantages

It is a particular advantage of the described embodiments that a system 10 is provided which is able to discriminate between planned rail ends and unplanned rail ends, the latter representing breaks in the rails. It is a further advantage of the described embodiments that a system 10 is provided which is able to be deployed under standard rolling stock which can operate at normal speed in all environments. With this arrangement, the system 10 can be deployed in harsh or hostile environmental conditions while still being able to provide an indication of the occurrence of a break in a rail to enable remedial action to be taken.

This is particularly advantageous in high haulage (e.g. heavy haul) rail applications, such as, for example, where iron ore is being transported from a mine to a port for shipment. This task is increasingly being done autonomously using driverless trains. In addition, the ability to detect a rail break and take immediate action allows for a higher carrying capacity on the railway track.

Therefore, in use, the system 10 is mounted on the last rail car 16 of a train to detect any rail breaks caused by that train. The system 10, should a rail break be detected, is configured to transmit data relating to that rail break via the signal processing module 40 and a communications link mounted on the train, as represented schematically by an antenna 64 in FIG. 2 of the drawings, to the operations centre. Personnel at the operations centre are then able to take action to repair the broken rail expeditiously to allow for continued use of the railway track 20.

As noted above, the applicant is not aware of any commercially available technology for broken rail detection from moving railway vehicles of a type that may be fitted to conventional wagons or locomotives. All of the existing technologies (for example ultrasonic flaw detection) are only suitable for operation from specialized trolleys that operate at relatively low speeds and require high maintenance and operator input.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for detecting the presence of a rail end in a rail of a railway track, the system including
   a support structure mountable to a component of a rail vehicle;
   at least one magnetic field generator carried by the support structure to generate a remanent magnetic field in the rail;
   a sensor arrangement carried by the support structure in spaced relationship to the magnetic field generator to detect magnetic flux leakage associated with the remanent magnetic field, the sensor arrangement including at least one pair of longitudinally spaced sensors, each sensor generating a measured signal based on the magnetic flux leakage detected by that sensor;
   a signal processing module responsive to the measured signals to calculate a differential signal from the measured signals of the sensors of the at least one pair of sensors, the differential signal being indicative of the presence of a rail end in the rail; and
   a discrimination module in communication with the signal processing module and configured to discriminate between a planned rail end and an unplanned rail end using pattern logic and the calculated differential signal, the pattern logic including at least one logic test which is applied to the calculated differential signal to determine if the rail end is a planned rail end or an unplanned rail end, the unplanned rail end being indicative of a break in the rail, and the planned rail end being indicative of a false positive.

2. The system of claim 1 wherein the sensors in the at least one pair of sensors are configured to take measurements of the magnetic flux leakage substantially simultaneously.

3. The system of claim 1 wherein the sensor arrangement includes a plurality of transversely arranged pairs of sensors, all the sensors being configured to take measurements of the magnetic flux leakage substantially simultaneously.

4. The system of claim 3 wherein the sensors of the sensor arrangement are arranged in at least two longitudinally spaced, transversely extending linear arrays of sensors.

5. The system of claim 3 wherein the signal processing module further compares the calculated differential signal from each pair of sensors to a threshold and, if the differential signal from each of more than a predetermined number of pairs of sensors exceeds the threshold, determining that a rail end exists.

6. The system of claim 1 wherein the signal processing module flags an unplanned rail end as a serious defect.

7. The system of any one of claim 1 which includes a magnetic field marker mountable to be associated with each of at least some planned rail ends of the railway track, the system further including at least one pair of laterally spaced sensors oriented to detect a magnetic field generated by the, or each, field marker, and the discrimination module further configured to discriminate between the planned rail end and the unplanned rail end based on the detected magnetic field.

8. A rail vehicle which includes
   a body;
   at least one bogie on which the body is supported for traversing a railway track; and
   at least one system, as claimed in claim 1, for detecting a break in a rail of the railway track, the system being mounted to the bogie.

9. A method for detecting the presence of a rail end in a rail of a railway track, the method including:
   generating a remanent magnetic field in the rail;
   detecting magnetic flux leakage associated with the remanent magnetic field;
   generating a measured signal from each sensor of at least one pair of longitudinally spaced sensors of a sensor arrangement, the measured signals based on magnetic flux leakage detected by the pair of sensors;
   calculating a differential signal from the measured signals of the sensors of the at least one pair of sensors, the differential signal being indicative of the presence of a rail end in the rail; and
   discriminating between a planned rail end and an unplanned rail end using pattern logic and the calculated differential signal, the pattern logic including at least one logic test which is applied to the calculated differential signal to determine if the rail end is a planned rail end or an unplanned rail end, the unplanned rail end being indicative of a break in the rail, and the planned rail end being indicative of a false positive.

10. The method of claim 9 which includes causing the sensors of the at least one pair of sensors to take the measurements of the magnetic flux leakage substantially simultaneously.

11. The method of claim 9 in which the sensor arrangement includes a plurality of transversely arranged pairs of sensors and in which the method includes causing all the sensors to take measurements of the magnetic flux leakage substantially simultaneously.

12. The method of claim 11 which includes comparing the calculated differential signal from each pair of sensors to a threshold and, if the calculated differential signal from each of more than a predetermined number of the pairs of sensors exceeds the threshold, determining that a rail end exists.

13. The method of claim 9 which includes flagging an unplanned rail end as a serious defect.

14. The method of claim 9 which includes associating a magnetic field marker with each of at least some rail ends of the railway track and detecting a magnetic field generated by the, or each, field marker.

15. A system for detecting a break in a rail of a railway track, the system including
- at least one magnetic field generator carried by a support structure to generate a remanent magnetic field in the rail;
- a sensor arrangement carried by the support structure in spaced relationship to the magnetic field generator to detect magnetic flux leakage associated with the remanent magnetic field, the magnetic flux leakage being indicative of a break in the rail; and
- a signal processing module responsive to an output from the sensor arrangement, the signal processing module comprising a discrimination module to discriminate between a planned rail end and an unplanned rail end using pattern logic and the output from the sensor arrangement, the pattern logic including at least one logic test which is applied to the output from the sensor arrangement to determine if the rail end is a planned rail end or an unplanned rail end, the unplanned rail end being indicative of a break in the rail, and the planned rail end being indicative of a false positive.

* * * * *